United States Patent
Bansal et al.

(10) Patent No.: US 11,138,006 B2
(45) Date of Patent: Oct. 5, 2021

(54) HYBRID DEVELOPMENT SYSTEMS AND METHODS

(71) Applicant: ServiceNow, Inc., Santa Clara, CA (US)

(72) Inventors: Pradeep Bansal, Foster City, CA (US); Scott Fuller, Woodinville, WA (US); Balaji Cuttackham, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/899,292

(22) Filed: Jun. 11, 2020

(65) Prior Publication Data

US 2020/0301703 A1 Sep. 24, 2020

Related U.S. Application Data

(63) Continuation of application No. 16/356,115, filed on Mar. 18, 2019, now Pat. No. 10,713,040, which is a continuation of application No. 15/588,004, filed on May 5, 2017, now Pat. No. 10,275,241.

(51) Int. Cl.
| | |
|---|---|
| *G06F 8/77* | (2018.01) |
| *G06F 8/70* | (2018.01) |
| *G06F 3/0484* | (2013.01) |
| *G06Q 10/06* | (2012.01) |

(52) U.S. Cl.
CPC ............ *G06F 8/77* (2013.01); *G06F 3/04842* (2013.01); *G06F 8/70* (2013.01); *G06Q 10/06313* (2013.01)

(58) Field of Classification Search
USPC ........................................................ 717/102
See application file for complete search history.

(56) References Cited

U.S. PATENT DOCUMENTS

| | | | |
|---|---|---|---|
| 6,321,229 | B1 | 11/2001 | Goldman |
| 6,609,122 | B1 | 8/2003 | Ensor |
| 6,678,887 | B1 | 1/2004 | Hallman |
| 6,799,189 | B2 | 9/2004 | Huxoll |
| 6,816,898 | B1 | 11/2004 | Scarpelli |
| 6,895,586 | B1 | 5/2005 | Brasher |
| 7,027,411 | B1 | 4/2006 | Pulsipher |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,392,300 | B2 | 6/2008 | Anantharangachar |
| 7,610,512 | B2 | 10/2009 | Gerber |
| 7,617,073 | B2 | 11/2009 | Trinon |
| 7,685,167 | B2 | 3/2010 | Mueller |

(Continued)

*Primary Examiner* — John Q Chavis
(74) *Attorney, Agent, or Firm* — Fletcher Yoder PC (57) ABSTRACT

Systems and methods may include software development tools that allow for planning hybrid projects performed according to a combination of project development models. A processor may be operatively coupled to a memory. The processor may determine a target application of an enterprise service. The processor may determine a backlog associated with the target application, wherein the backlog comprises one or more tasks, one or more stories, or any combination thereof. The processor may generate a hybrid project from the backlog comprising a waterfall phase having at least one task and an agile phase having at least one story.

20 Claims, 12 Drawing Sheets

(56) References Cited

U.S. PATENT DOCUMENTS

| | | |
|---|---|---|
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,944 B2 | 8/2014 | Kowalski |
| 8,818,994 B2 | 8/2014 | Kowalski |
| 8,887,133 B2 | 11/2014 | Behnia |
| 8,983,982 B2 | 3/2015 | Rangarajan |
| 9,015,188 B2 | 4/2015 | Behne |
| 9,037,536 B2 | 5/2015 | Vos |
| 9,137,115 B2 | 9/2015 | Mayfield |
| 9,137,116 B1 | 9/2015 | Mayfield |
| 9,239,857 B2 | 1/2016 | Trinon |
| 9,323,801 B2 | 4/2016 | Morozov |
| 9,412,084 B2 | 9/2016 | Kowalski |
| 9,467,344 B2 | 10/2016 | Gere |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,613,070 B2 | 4/2017 | Kumar |
| 9,659,051 B2 | 5/2017 | Hutchins |
| 9,792,387 B2 | 10/2017 | George |
| 9,852,165 B2 | 12/2017 | Morozov |
| 10,002,203 B2 | 6/2018 | George |
| 10,275,241 B2 * | 4/2019 | Bansal ................ G06F 3/04842 |
| 10,713,040 B2 * | 7/2020 | Bansal .................... G06F 8/77 |
| 2013/0090971 A1 * | 4/2013 | Morris .................. G06Q 10/06 705/7.22 |
| 2013/0091170 A1 | 4/2013 | Zhang |
| 2014/0122161 A1 | 5/2014 | Gupta |
| 2014/0344003 A1 | 11/2014 | Roy Bardhan |
| 2015/0073849 A1 | 3/2015 | Meyer |
| 2016/0154728 A1 | 6/2016 | Bassin |
| 2016/0024908 A1 | 8/2016 | Jagannathan |
| 2016/0335583 A1 | 11/2016 | Suntinger |
| 2017/0083290 A1 | 3/2017 | Bharthulwar |

\* cited by examiner

| PLANNING CONSOLE | | | | | | | | | | | | | | |
|---|---|---|---|---|---|---|---|---|---|---|---|---|---|---|
| WBS | SHORT DESCRIPTION | PLANNED START DATE | PLANNED END DATE | PLANNED DURATION | ASSIGNED TO | YEAR-2016 | YEAR-2017 | | | | | | | |
| | | | | | | DEC | JAN | FEB | MAR | APR | MAY | JUN | JUL |
| | ▽ NEW PROJECT | 2017-01-26 09:47:29 | 2017-06-15 09:47:29 | 100 DAYS | | | | | | | | | |
| 1 | ANALYZE & FINALIZE REQUIREMENTS | 2017-01-26 09:47:29 | 2017-02-23 09:47:29 | 20 DAYS | | | | | | | | | |
| 2 | BUILD DASHBOARD | 2017-02-23 09:47:29 | 2017-05-18 09:47:29 | 60 DAYS | | | | | | | | | |
| 3 | PERFORM ACCEPTANCE TESTING | ADD CHILD TASKS / ADD EXTERNAL DEPENDENCY / EDIT / DELETE | | 20 DAYS | | | | | | | | | |

| ◁ PLANNING CONSOLE ▽ | | ⊞ ⊟ ➡ ↙ ↑ ↓ △ | | | | YEAR-2016 ▽ | YEAR-2017 ▽ | | | | | | | NEW PROJECT ▷ |
|---|---|---|---|---|---|---|---|---|---|---|---|---|---|---|
| ▽WBS | SHORT DESCRIPTION | PLANNED START DATE | PLANNED END DATE | PLANNED DURATION | ASSIGNED TO | DEC | JAN | FEB | MAR | APR | MAY | JUN | JUL | |
| ✦ | ▽ NEW PROJECT | 2017-01-26 09:47:29 | 2017-06-15 09:47:29 | 100 DAYS | | | ▨▨▨▨▨▨▨▨ | | | | | | | |
| 1 | ANALYZE & FINALIZE REQUIREMENTS EXECUTING | 2017-01-26 09:47:29 | 2017-02-23 09:47:29 | 20 DAYS | | | ▨ | | | | | | | |
| 2 | | 2017-04-25 08:00:00 | 2017-05-22 17:00:00 | 20 DAYS | | | | | ▨ | | | | | |
| 3 | BUILD DASHBOARD | 2017-02-23 09:47:29 | 2017-05-18 09:47:29 | 60 DAYS | | ⊞ | | | ▨▨▨▨▨ | | | | | |
| 4 | PERFORM ACCEPTANCE TESTING | 2017-05-18 09:47:29 | 2017-06-15 09:47:29 | 20 DAYS | | | | | | | | ▨ | | |

FIG. 9

| WBS | SHORT DESCRIPTION | PLANNED START DATE | PLANNED END DATE | PLANNED DURATION | ASSIGNED TO | YEAR-2016 DEC | JAN FEB MAR |
|---|---|---|---|---|---|---|---|
| | ∨ NEW PROJECT | 2012-01-26 09:47:29 | 2017-06-15 09:47:29 | 100 DAYS | | | |
| 1 | ANALYZE & FINALIZE REQUIREMENTS | 2017-01-26 09:47:29 | 2017-02-23 09:47:29 | 20 DAYS | | | |
| 2 | EXECUTING | 2017-04-25 08:00:00 | 2017-05-22 17:00:00 | 20 DAYS | | | |
| 3 | BUILD DASHBOARD | 2017-02-23 09:47:29 | 2017-05-18 09:47:29 | 60 DAYS | | | |
| 4 | PERFORM ACCEPTANCE TESTING | 2017-05-18 09:47:29 | 2017-06-15 09:47:29 | 20 DAYS | | | |

NOTIFICATIONS

| NEW | ARCHIVED |
|---|---|
| EXTERNAL TASK UPDATE PRJTASK0011144-EXCUTING | |
| IMPACTED TASK PRJTASK0011186(3)- BUILD DASHBOARD BEFORE (2017-02-23 09:47:29 TO 2017:05:18 09:47:29) AFTER (2017-05-23 08:00:00 TO 2017-08-14 17:00:00) | |

[ ACCEPT ]  [ REJECT ]

RESOURCE PLAN
NEW RECORD [OPERATIONAL VIEW]

| | |
|---|---|
| NUMBER | RPLN0001091 |
| RESOURCE TYPE | GROUP RESOURCE |
| *GROUP RESOURCE | IT APP DEV |
| MEMBER PREFERNCE | ALL MEMBERS |
| REQUEST TYPE | % CAPACITY |
| *% CAPACITY | 20 |
| *PLANNED HOURS | 0 |
| ALLOCATED HOURS | 0 |
| ACTUAL HOURS | |
| HARD ALLOCATION SPREAD | EVEN |
| NOTES | |

| | |
|---|---|
| NAME | OPERATIONAL WORK |
| OPERATIONAL WORK TYPE | MEETING |
| START DATE | 2017-01-01 |
| END DATE | 2017-12-31 |
| ALLOCATIONS | MONTHLY |
| STATE | PLANNING |
| PLANNED COST | $0.00 |
| ALLOCATED COST | $0.00 |
| ACTUAL COST | $0.00 |

[SUBMIT]

HYBRID DEVELOPMENT SYSTEMS AND METHODS

CROSS-REFERENCE TO RELATED APPLICATION(S)

This application is a continuation of U.S. application Ser. No. 16/356,115, filed Mar. 18, 2019 which is a continuation of U.S. application Ser. No. 15/588,004, filed May 5, 2017; each of which are incorporated herein.

BACKGROUND

The present disclosure relates generally to project planning tools. More particularly, the present disclosure is related to different methodologies used for project planning.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Developing project plans can be a complex process. To manage this complexity, a number of project planning models and tools have been developed. For example, a planning tool may be used to plan development of a new or updated software application in a software service. The planning tool may be designed to plan software development in accordance with a waterfall model, which has a set of phases performed sequentially. That is, the planning tool may be designed with a waterfall model in mind to enable sequential development of phases of a project.

However, in practice, project planning may benefit from alternative or mixed development approaches. For example, different aspects of project planning may benefit from parallel development approaches while other benefit from sequential development. Likewise, interdependencies and/or unforeseen circumstances may benefit from non-rigorous approaches. As a result, actual development processes typically do not adhere to single or fixed models, which may lead to unrealistic modeling scenarios and/or unmet development goals. As such, conventional planning tools may not facilitate practical planning of projects.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods described below may include project planning tools that allow for planning hybrid projects performed according to a combination of project planning models. Certain project planning models may be a better fit for managing certain parts of a project. By allowing developers to plan for hybrid projects, the project planning tool may better align managing the project with expected implementation of the project and provide flexibility to those managing the project lifecycle.

With the preceding in mind, aspects of the present approaches may be implemented on various types of processor-based systems, either alone or in communication with one another. In an embodiment, such a processor-based system may be a computing device that includes a processor operatively coupled to a memory. The processor may execute instructions on the memory to generate a hybrid project that includes both a waterfall phase and an agile phase as discussed herein. The waterfall phase may include one or more tasks to complete during the phase. Similarly, the agile phase may include one or more stories to complete during the agile phase. Each of the waterfall phase and the agile phase may be included on a schedule of the hybrid project.

Further, as discussed herein, in some embodiments projects may include tasks that depend on other tasks or events associated with a separate or external project. As an example, a schedule may be generated for a first task of a first project where aspects of the schedule depends on a second task of a second project. Such dependencies may be of different types. For example, when the dependency type is a hard dependency the schedule of the first task may be automatically adjusted based on changes to the second task as changes to the second task occur. For instance, if the second task is expected to be completed a day later than originally planned and the first task depends upon completion of the second task, the processor may update the schedule of the first task to be delayed by a day. Correspondingly, when the dependency type is a soft dependency, instead of rigorous adjustment of the schedule of one event in view of the status of the other, a notification may instead be generated (e.g., an email, text, or voicemail) to indicate to a user that a delay may be expected on the first task, but a schedule adjustment may be optional or circumstance dependent, as opposed to rigorously applied.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Aspects of the present disclosure describe a project planning tool, such as a software development tool, that may be used to plan projects that include a combination of project planning methodologies. For example, certain projects may be planned according to both a waterfall model and an agile model. A waterfall model, or waterfall methodology, may refer to a process in which phases of a project are completed in sequential order. For example, requirements may be gathered in a first phase. Upon completion of gathering requirements, design of the application may begin in a second phase. After designing the application, implementation of the design may begin a third phase, and followed by testing in a fourth phase. Further, each of the phases may be associated with one or more tasks to complete to proceed to the next phase. A task refers to a unit of work that makes up a waterfall phase. The tasks of later phases may depend upon the completion of tasks in earlier phases. As described below, a task dependency may be created when a task is prevented from starting or finishing based on the state of another task. While this is given as a general example of the waterfall model, any suitable implementation of the waterfall model may be used in accordance with the present approach. For instance, some tasks of phases may be completed independent of certain tasks of other phases, thereby resulting in overlapping phases or phases performed in parallel.

An agile model, or agile development methodology, may refer to a short, fixed schedule of cycles performed in an iterative process, called a sprint. During a sprint, a team of software developers will complete a software feature from an end-user perspective, referred to as a story, from a backlog of software features desired to be included in the application. That is, upon completion of the story, a feature of the project is developed such that it may be included into the application in further releases. For example, the story may be a feature or functionality that is ready for distribution/use (e.g., provided to an end user). A release may include more than one story that has been completed in the release.

To plan projects according to the waterfall model or the agile development model, various project planning tools may be used. Some project planning tools may enable planning in accordance with the waterfall model, whereas other project planning tools may enable planning in accordance with the agile development model. Further, in practical settings, projects may involve development in accordance with both waterfall and agile development methodologies. For example, projects may include some iterative aspects better suited for the agile development model and some sequential aspects better suited for the waterfall model. As such, a project planning tool that enables hybrid projects to be planned that include the waterfall model and the agile development model may be useful.

Figure 1:
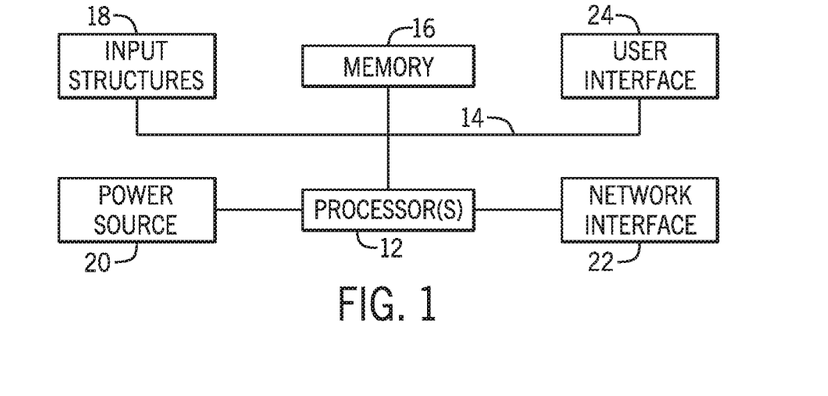
FIG. 1 is a block diagram of a computing device, in accordance with aspects of the present disclosure.

With this in mind, and by way of background, it may be appreciated that the present approach may be implemented using a processor-based system such as shown in FIG. 1. FIG. 1 generally illustrates a block diagram of example components of a computing device 10 and their potential interconnections or communication paths. The computing device 10 may be an embodiment of a client, an application server, or database server, among others, as discussed in greater detail below. As used herein, a computing device 10 may be implemented as part of a computing system that includes multiple computing devices and/or a single computing device, such as a mobile phone, a tablet computer, a laptop computer, a notebook computer, a desktop computer, a server computer, and/or other suitable computing devices.

As illustrated, the computing device 10 may include various hardware components. For example, the device includes one or more processors 12, one or more busses 14, memory 16, input structures 18, a power source 20, a network interface 22, a user interface 24, and/or other computer components useful in performing the functions described herein. The one or more processors 12 may include a processor capable of performing instructions stored in the memory 16. For example, the one or more processors may include microprocessors, system on chips (SoCs), or any other circuitry capable of performing functions by executing provided instructions, such as those stored in the memory 16 or in another accessible location. The one or more busses 14 include suitable electrical channels to provide data and/or power between the various components of the computing device.

The memory 16 may include any tangible, non-transitory, and computer-readable storage media. For example, the memory 16 may include volatile memory, non-volatile memory, or any combination thereof. The input structures 18 provide structures to input data and/or commands to the one or more processor 12. For example, the input structures 18 may include a positional input device, such as a mouse, touchpad, touchscreen, as well as devices such as keyboards. The power source 20 can be any suitable source for powering the various components of the computing device 10. The network interface 22 is also coupled to the processor 12 via the one or more busses 14. The network interface 22 includes one or more transceivers capable of communicating with other devices over one or more networks (e.g., a communication channel). A user interface 24 may include a display that is configured to display images transferred to it from the one or more processors 12.

Figure 2:
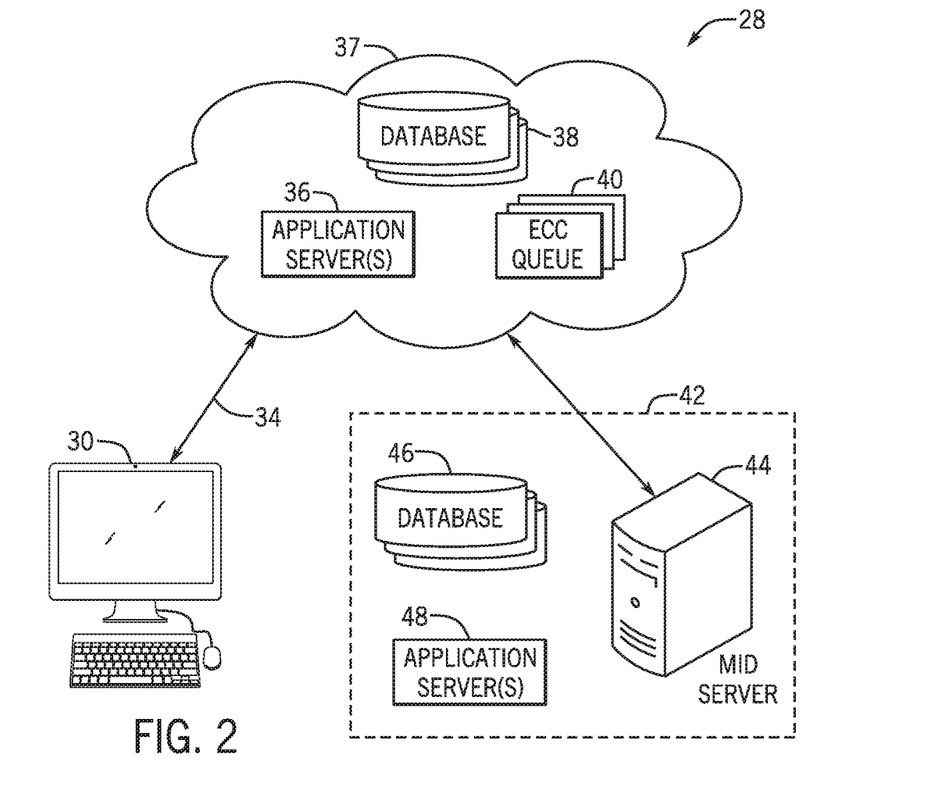
FIG. 2 is a block diagram of a distributed computing system that utilizes one or more of the computing device of FIG. 1, in accordance with aspects of the present disclosure.

A real-world context in which processor-based systems, such as the computing device 10 of FIG. 1, may be employed to implement the present approach, is shown in FIG. 2. In this example, a number of computing devices 10 are employed to implement a distributed computing framework 30, shown as a block diagram in FIG. 2, in which certain of the constituent devices may maintain or interact with each other in accordance with the approach discussed herein. In the illustrated embodiment in FIG. 2, a client 32 communicates with a cloud service 34 over a communication channel 36. In the depicted topology, access to non-cloud resources, such as database 46 and/or application server 48, from the cloud service 32 is enabled via a management, instrumentation, and discovery (MID) server 44 via an External Communications Channel (ECC) Queue 40. Although the system 28 is described as having the application servers 36, 48, the databases 38, 46, the ECC queue 40, the MID server 44, and the like, it should be noted that the embodiments disclosed herein are not limited to the components described as being part of the system 28. The systems and methods described herein may be performed on the client, the cloud service 32, the MID server, or any suitable combination.

With the preceding in mind, systems and methods described below may be performed via the computing device 10 and/or the above computing framework 30. As mentioned above, application developers may utilize various tools to develop enterprise services. For example, enterprise services may be planned using a project planning application on an application server 38 that is provided to the computing device 10 of the client 32 via the communication channel 36. As described below, the project planning application may allow for the planning of a hybrid project that includes a combination of a waterfall methodology and an agile methodology.

Figure 3:
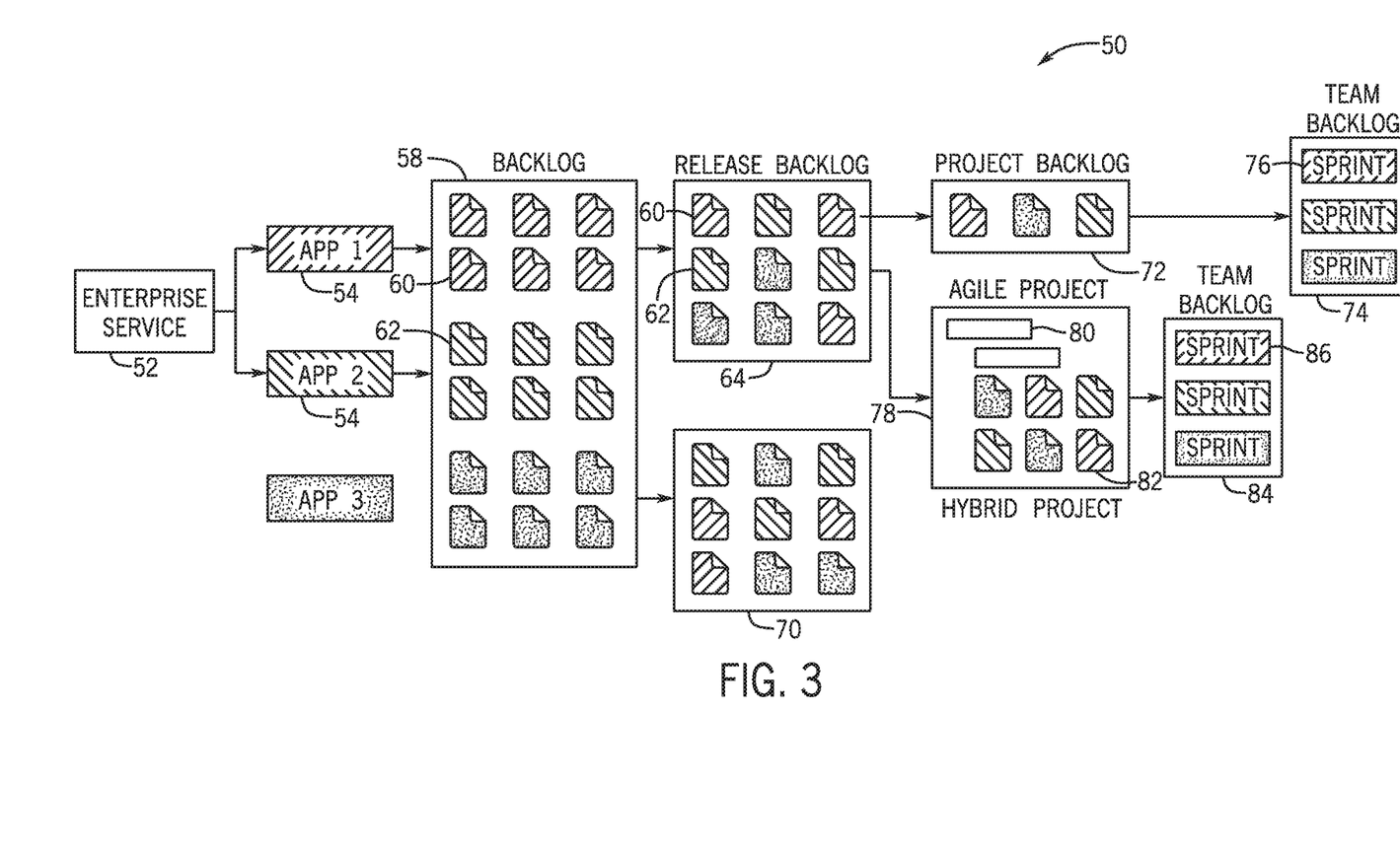
FIG. 3 is a flow diagram of a method to implement a hybrid project, in accordance with an embodiment.

FIG. 3 is a process flow diagram that shows a process 50 performed to release or update an enterprise service 52. The enterprise service 52 may include one or more applications 54 that may be provided using any suitable method. The applications 54 may include any suitable applications that are being released or updated to users. The computing device 10 may identify one or more backlogs from several applications of the enterprise service 52. For example, users of the applications 54 may provide feedback in the application 54 by reporting bugs, features, or functionality desired to be included in future releases. The computing device 10 may receive the feedback and identify a product backlog 58 based on the applications 54 and the feedback received.

The product backlog 58 may include one or more stories 60 and/or tasks 62 to complete in the application development life cycle. The stories 60 may refer to one or more features to be provided to users of a application 54 by the end of an iteration of a specific duration of time of the agile development process, referred to as a sprint. The tasks 62 may refer to an assignment (e.g., a unit of work) to complete during a phase in the waterfall development process. That is, several tasks may be performed at different phases of the development process to provide a feature to the users by the end of the waterfall development process.

The processor 12 may determine a combination of stories 60 and/or tasks 62 to complete in a release of the application 54, referred to as a release backlog 64. The release backlog 64 may include an ordered list of stories 60 and/or tasks 62 based on priority. For example, features developed in stories 60 and/or tasks 62 of the product backlog 58 that are most desired by users may be given higher priority than stories 60 and/or tasks 62 that are less desired. Further factors may be considered in determining which features are included in the release backlog 64, such as complexity, time to complete the feature, time until the next release, dependencies upon other features, and the like. Lower priority features may be included in another release backlog 70 to complete in a later release.

The processor 12 may generate a plan having one or more projects from the stories 60 and/or tasks 62 in the release backlog to form a project backlog. For example, the processor 12 may generate an agile project 72. Further, the processor 12 may then generate a team backlog 74 having sprints 76, each sprint 76 having one or more stories 60, to be performed by the development team of the applications 54. Because some situations may be better suited to a combination of different project types, the processor 12 may generate a hybrid project 78 having a combination of a waterfall model 80 and an agile model 82. The agile model 82 and the waterfall model 80 of the hybrid project 78 may include stories 60 and tasks 62 from the release backlog 64, respectively. The processor 12 may then generate a team backlog 84 having respective tasks and/or sprints 86 to be performed by the development team.

Figure 4:
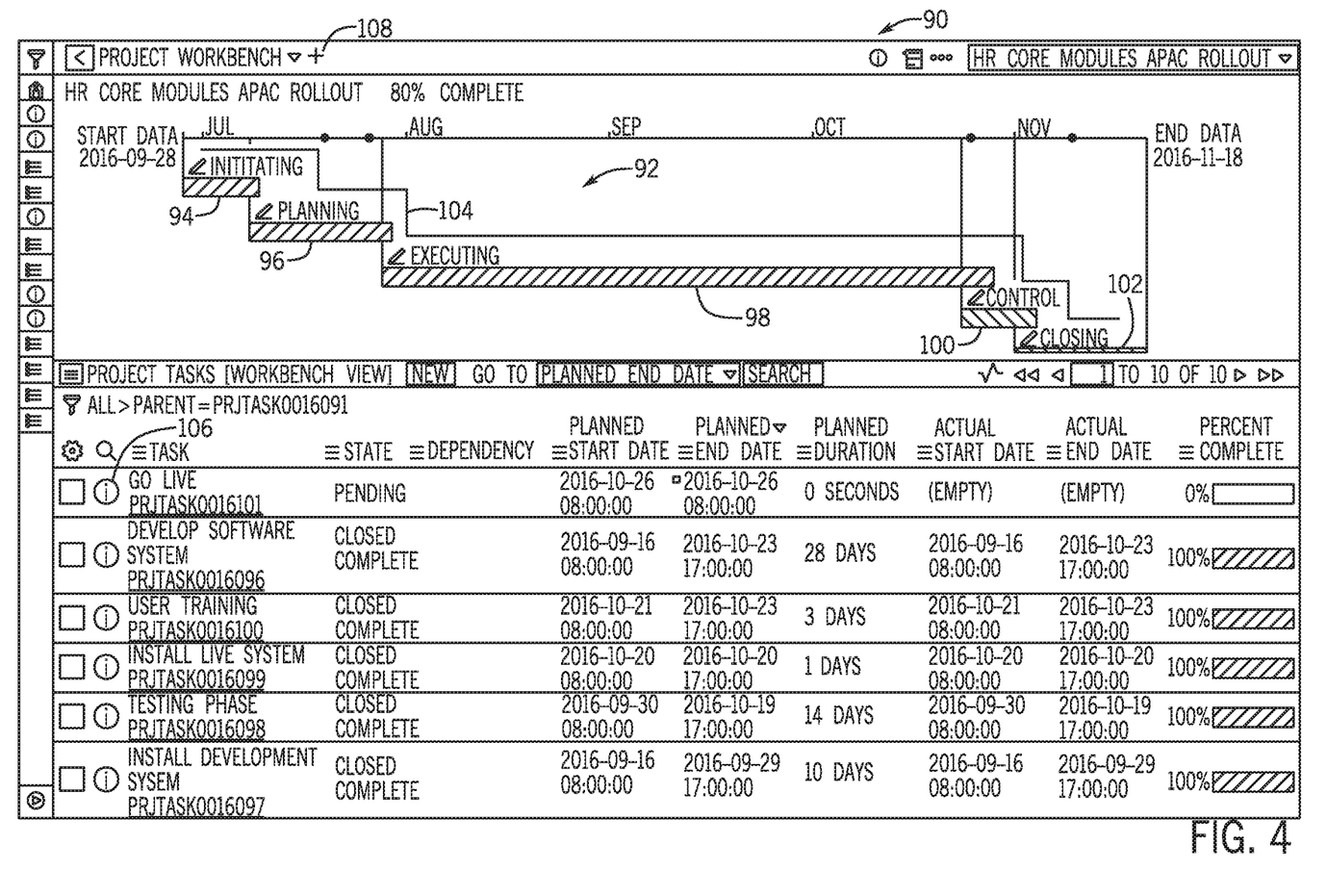
FIG. 4 is an example screenshot displaying a first project of a hybrid project, in accordance with an embodiment.

FIG. 4 is an example of a user interface 90 displaying phases in a waterfall model 92 to complete during the application development process. For example, the waterfall model 92 includes an initiating phase 94, a planning phase 96, an executing phase 98, a control phase 100, and a closing phase 102. While these phases are used as an example, any suitable phases may be performed. Additional and/or alternative phases may include requirements gathering, design, implementation, testing, and maintenance phases, among others. Progression through phases of the waterfall model 92 may include waterfall steps 104 downward towards completion of the project as tasks are completed.

As shown in FIG. 4, the user interface 90 may include a list of tasks 106 associated with the waterfall model 92 to be completed in the project. Each of the tasks in the list of tasks 106 may include a task status, dependencies of the task, a planned start date, a planned duration, an actual start date an actual end date, a percentage of completion of the task, and the like. The list of tasks 106 may be derived from the project backlog described with respect to FIG. 3. As mentioned above, in practice, projects may be organized as a hybrid project that is a combination of one or more phases that are performed according the waterfall methodology and one or more phases that are performed according to the agile methodology. The user interface 90 may include an add icon 108 that may be selected to add an additional phase to the project.

Figure 5:
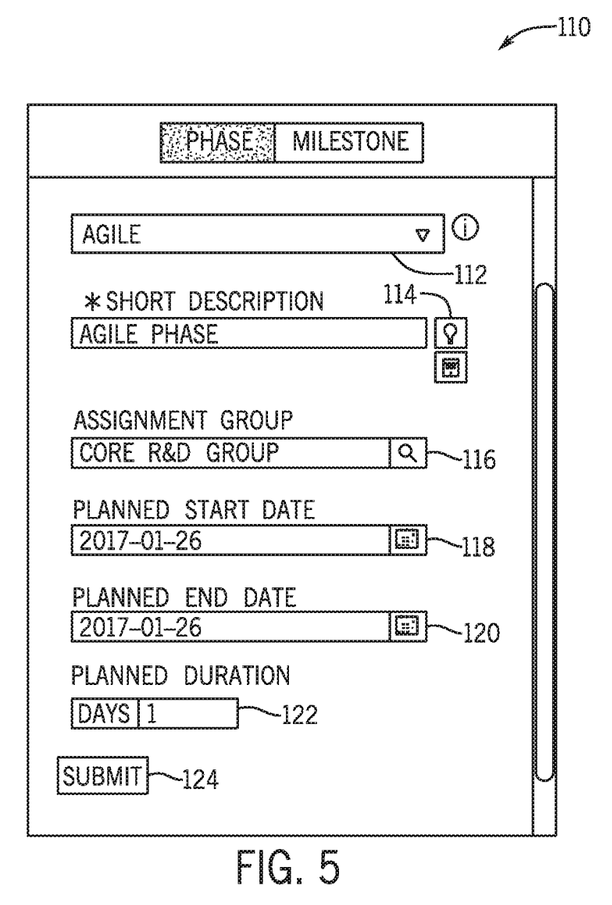
FIG. 5 is an example screenshot displaying an add menu to add a second project to a hybrid project, in accordance with an embodiment.

Upon receiving a selection of the add icon 108, the processor 12 may display an overlay that enables the user to add a phase that uses the waterfall model or the agile model. FIG. 5 is an example of an overlay that may be displayed by the processor 12 to add an additional phase to the project in accordance with the waterfall model or the agile model. The processor 12 may receive selections regarding a type of phase (e.g., a phase that is performed according to the agile methodology or waterfall methodology), a description of the phase, a group to which the phase has been assigned, a planned start date, a planned end date, a planned duration, and the like. Upon receive selection of the submit icon, the processor 12 may generate a hybrid project that includes a waterfall phase and an agile phase.

Figure 6:
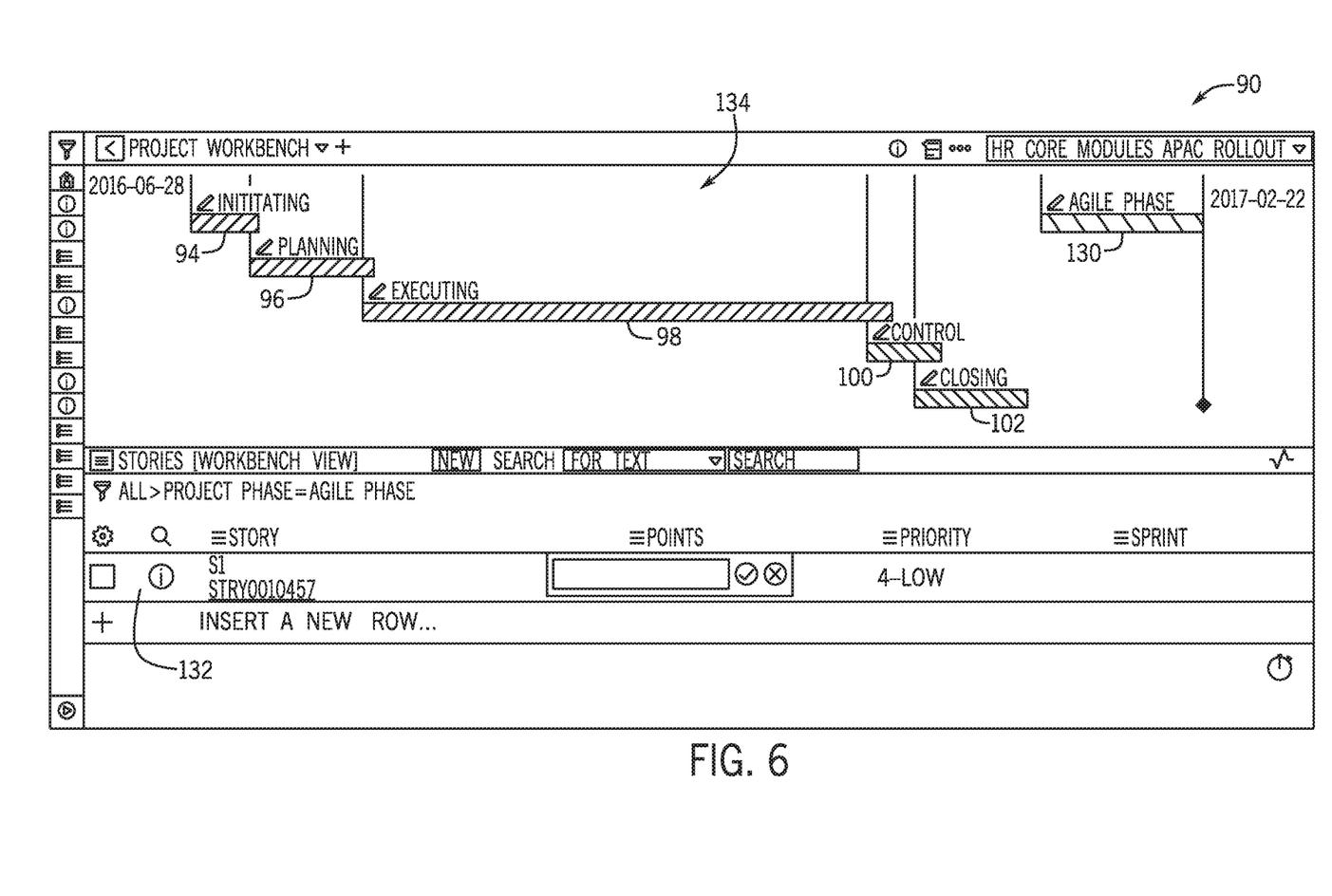
FIG. 6 is an example of a screenshot displaying a hybrid project, in accordance with an embodiment.

FIG. 6 is the user interface 90 updated to include a combination of at least one waterfall phase 94, 96, 98, 100, 102 and at least one agile phase 130. The agile phase 130 may include a list of one or more stories 132 to complete during the agile phase. Each story in the list of stories 132 may include points, a priority level, a sprint associated with the story, and the like. The processor 12 may then provide the tasks and/or the stories in the order described by the combined schedule 134 to application developers to complete the tasks and/or the stores at the specified times. In the illustrated embodiment of the combined schedule 134, the application developers may perform, in order, the initiating phase 94, the planning phase 96, the executing phase 98, the control phase 100, the closing phase, and the agile phase 130. While the agile phase 130 is added at the end in this example, the agile phase 130 may be added to the project at any suitable location. The processor 12 may send instructions to the display of the computing device 10 to display the schedule 134 having both times (e.g., durations, start times, end times) at which waterfall phases are planned to occur and times at which agile phases are planned to occur. The schedule 134 may be based on dependencies between the tasks and/or stories, expected start times, expected durations, and expected end times.

Additionally and/or alternatively, project management tools in enterprise settings typically separate projects for organizational purposes. That is, the projects can be managed in an organized manner by allocating resources and assigning tasks to particular projects. However, in practical settings, tasks in certain projects may have dependencies from outside the project. For example, a first task may have a dependency on a second task from an external project (e.g., managed separately). However, because project management tools have the projects separated, if the second task is performed at a later time than an expected date in the external project, the first task that depends on the second task may not accurately reflect this change in circumstance. To address this problem, embodiments described below may enable a user to add external dependencies from projects other than the project being edited.

Figure 7:
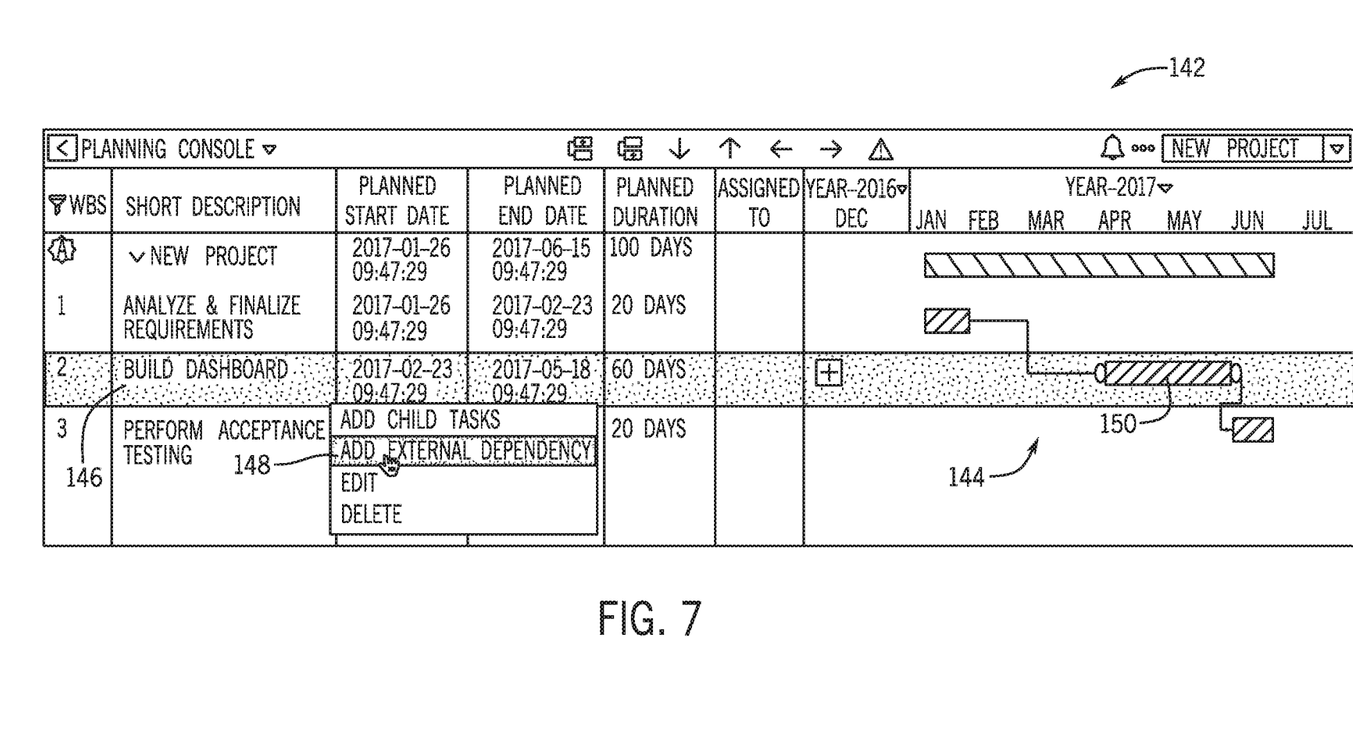
FIG. 7 is an example of a screenshot displaying a project with a task to be associated with an external dependency, in accordance with an embodiment.

FIG. 7 is a user interface 142 displaying a project being managed. The project includes a set of phases 144 that are performed according to a waterfall model. While a waterfall model is used here as an example, as explained above, the project may include both waterfall phases and agile phases. As an example, the project includes a task 146 that is planned according to a schedule 150 between April and May. The processor 12 may receive a selection 148 to add an external dependency to the project. Upon receiving the selection 148, the processor 12 may provide a prompt to enable the user to add an external dependency to task 146.

Figure 8:
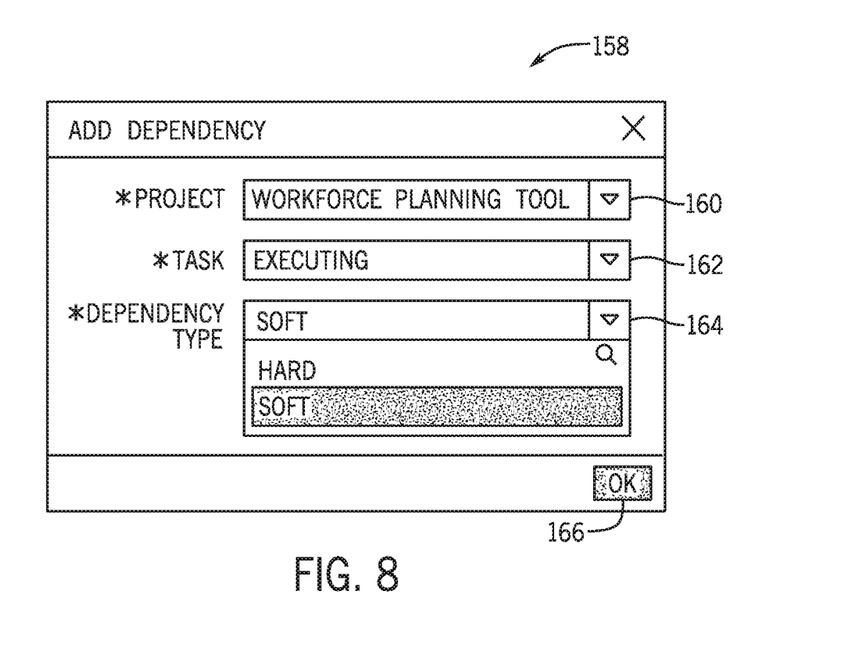
FIG. 8 is an example of a screenshot displaying a menu to add an external dependency, in accordance with an embodiment.

FIG. 8 is an example of an overlay 158 displayed via the processor 12 on the user interface 142 to enable the user to add an external dependency. The overlay 158 may include a project selection 160, an external task selection 162 based on the project selection 160, and a selection of a dependency type 164. As shown on the overlay 158, the dependency type 164 may be a hard dependency type in which the schedule of the phases 144 is automatically adjusted in response to some or all events associated with the external task. For example, delays in the external task, in the case of a hard dependency, may result in a corresponding extension or delay in the dependent phase of the first or primary task. Conversely, an early completion of external task may or may not result in a corresponding change in the first or primary task.

However, depending on the context, characterization of a task as having a hard dependency on another, external, task may not be suitable. In such circumstances, it may be more appropriate to characterize such as dependency as being a soft dependency in which delays or changes in the external task do not result in an automatic adjustment to the scheduling of the first or primary task. Instead, such a soft dependency context may refer to a dependency on a task in which the processor 12 provides a notification when there is an expected delay due to the dependency on the external task, allowing a user to decide what scheduling adjustments, if any, are needed.

Figure 9:
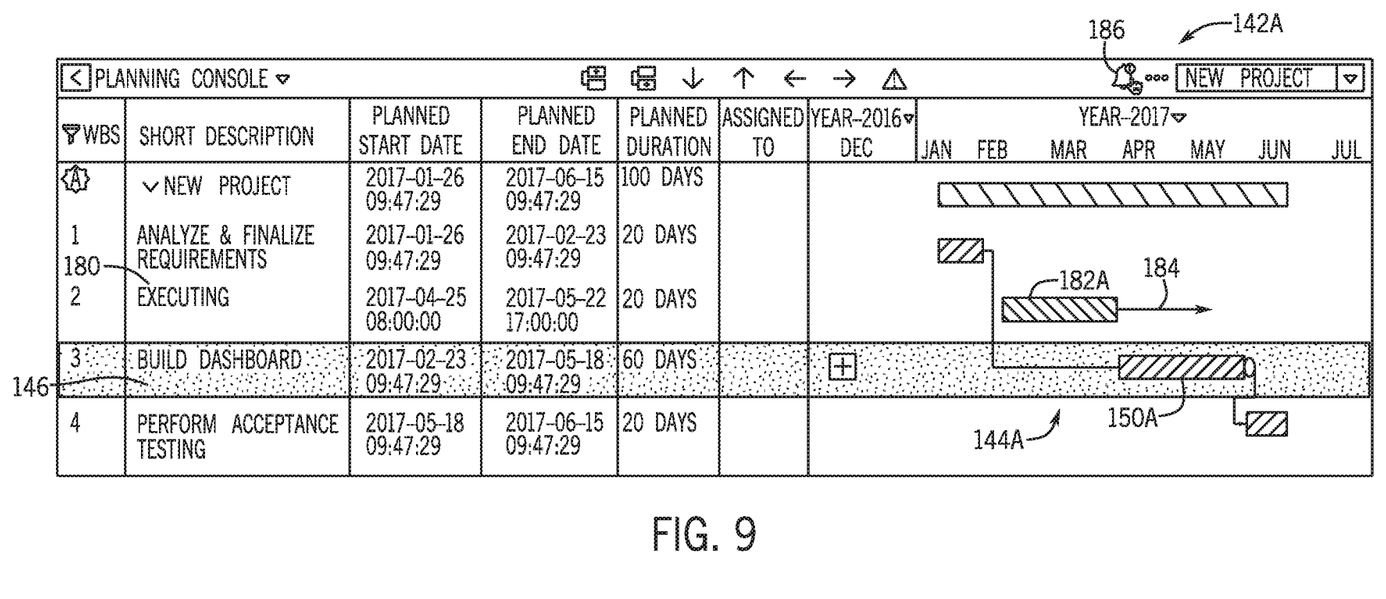
FIG. 9 is an example of a screenshot displaying an added external dependency to the project of FIG. 7, in accordance with an embodiment.

FIG. 9 is an example of updated phases 144A of an updated user interface 142A displayed by the processor 12 on the display upon receiving a selection of an accept button 166. The user interface 142A includes a task 180 that has been included from the external project added via the overlay 158. The task 180 is planned according to a schedule 182 in the external project from the end of February to April that has been included in the updated phases 144A.

By including the external dependency in the project, the plan of the project may account for any changes that occur due to external projects. As an example, a delay in the task 180 may occur causing the schedule 182 to be delayed until the end of May, as indicated by arrow 184. Upon receiving an indication that the task 180 of the external dependency has been delayed, which causes a delay in the task 146, the processor 12 may automatically adjust the task 146 to account for the delay in the task 180 when the dependency type is a hard type.

When the dependency type is a soft type, the processor 12 may provide a notification to the user that the task 180 is expected to cause a delay in task 146. For example, the processor 12 may send a message via email, text, or voicemail, among others. In the illustrated embodiment, the processor 12 displays a notification 186 on the user interface 142A to indicate to the user that there is an update to the project.

Figure 10:
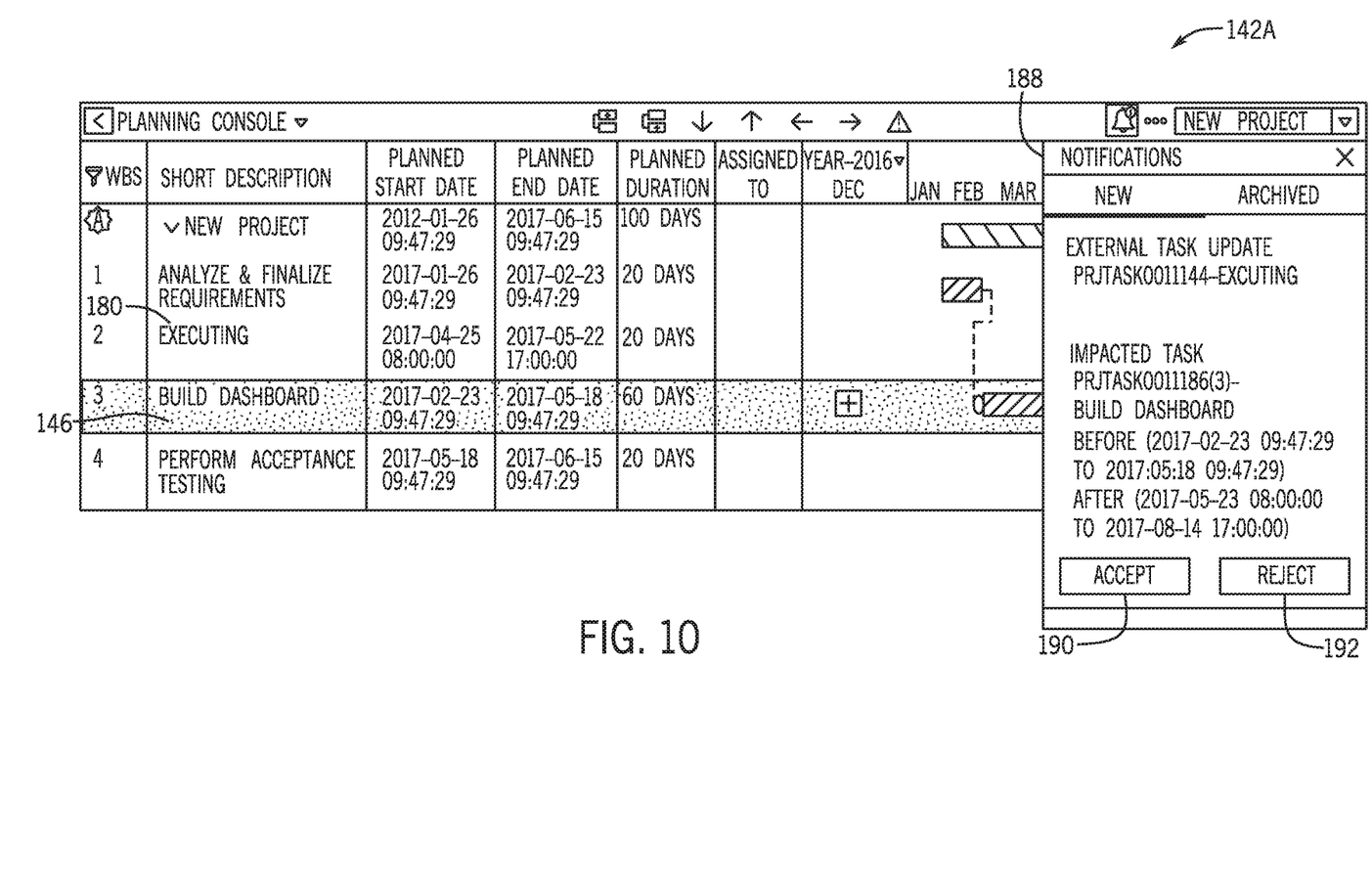
FIG. 10 is an example of a screenshot displaying a notification of a soft dependency, in accordance with an embodiment.

FIG. 10 is an example of an overlay 188 displayed on the user interface 142A via the processor 12 to indicate that the task 146 is expected to be delayed due to the external dependency on task 180. The processor 12 may receive a selection accepting 190 that the task 146 is delayed due to the external task 180 or receive a selection rejecting 192 that the task 146 is delayed. That is, a soft dependency may provide flexibility to adjust the schedule or to leave the schedule as is.

Figure 11:
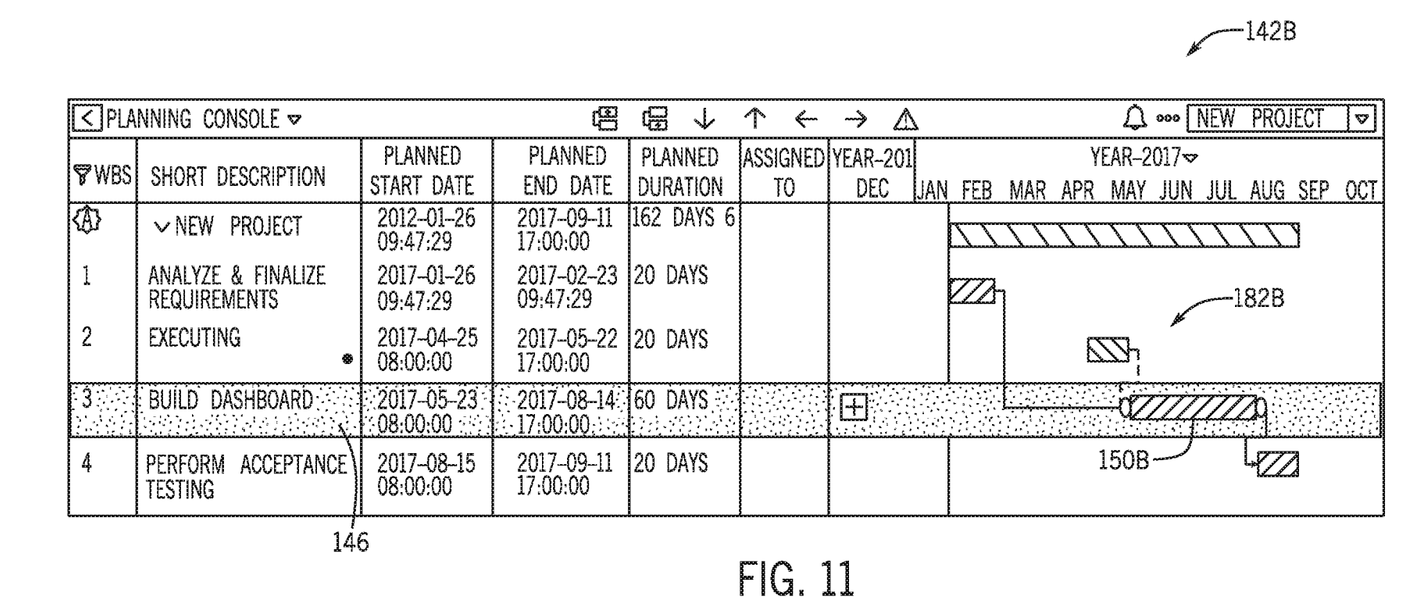
FIG. 11 is an example of a screenshot displaying an adjusted schedule due to the external dependency, in accordance with an embodiment.

FIG. 11 is an example of the user interface 142B updated upon accepting the changes to the task 146. The processor 12 has adjusted task 182B to be completed at the end of May based on the delay in the external project. Further, the processor 12 has adjusted task 150B to begin after the adjusted task 182B ends at the end of May.

Figure 12:
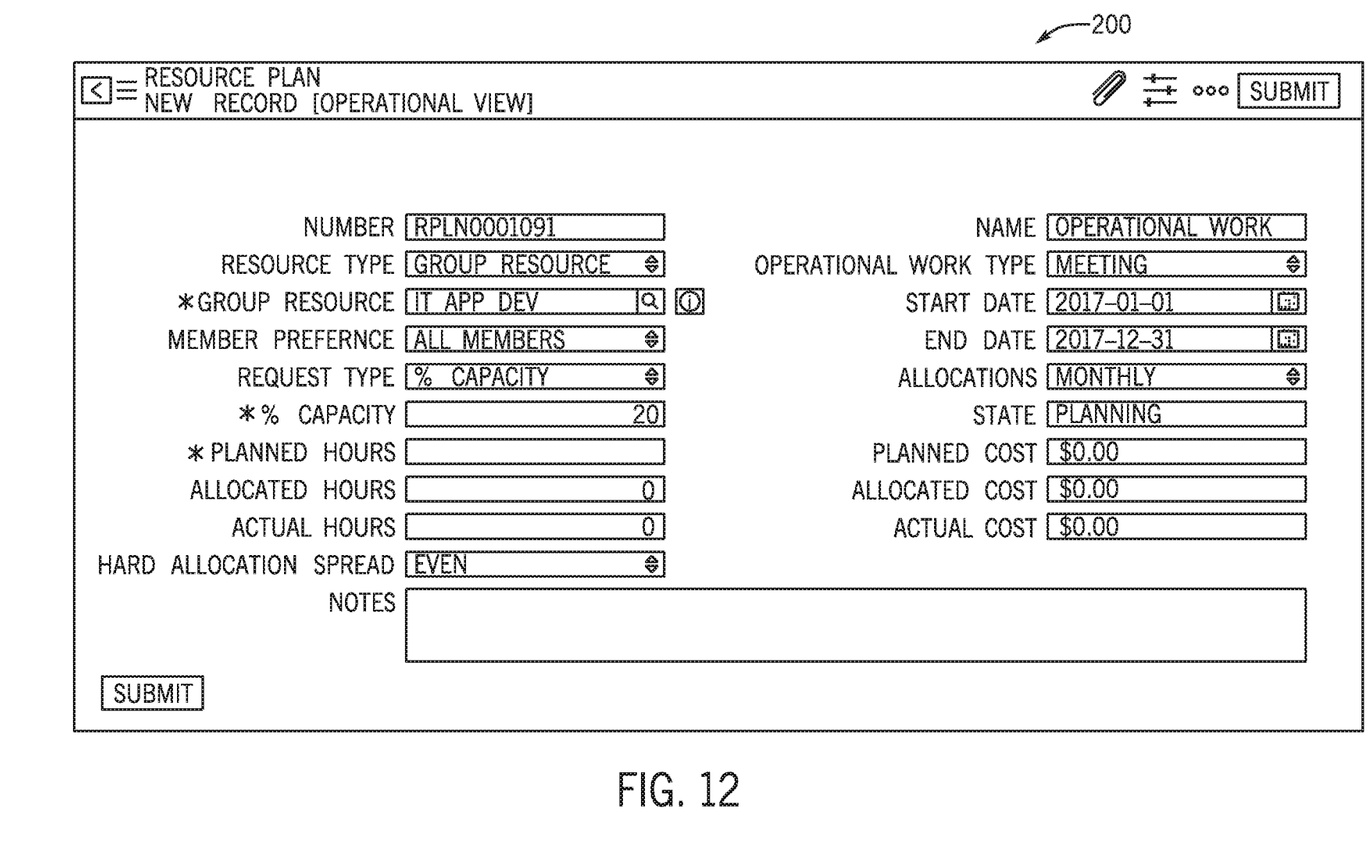
FIG. 12 is an example of a screenshot displaying a resource plan, in accordance with an embodiment.

FIG. 12 is an example of user interface 200 of a resource plan that may be provided as a service the client 32. The resource plan may allow a user to set aside resources outside of the project management services described above. For example, application developers may have a certain amount of hours allocated to meetings or operational work to keep the lights on each month that may not be incorporated into a particular project the application developer is working on. To manage application developer time, a request type of hours, % capacity, or man days may be included. For example, the resource plan may allow allocation of application developer time as a percentage of capacity. That is, an application developer may spend approximately 20% of his time in meetings, which may be set aside for resource purposes while not spending that time on a particular project.

Figure 13:
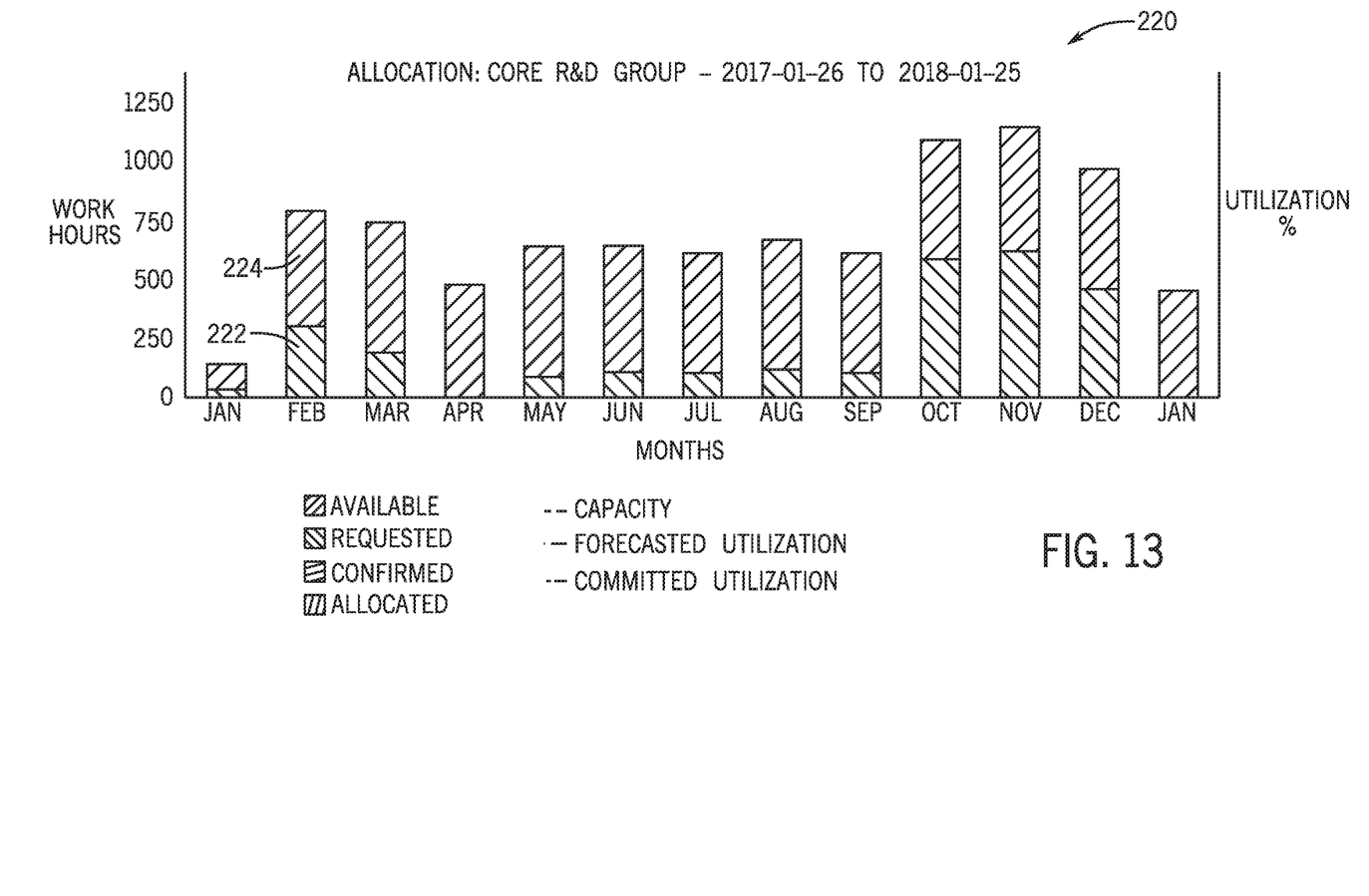
FIG. 13 is an example of a screenshot displaying a graph of allocation of the resources based on the resource plan, in accordance with an embodiment.

FIG. 13 is an example of a resource allocation graph 220 having certain percentages of capacity 222 allocated via the user interface 200. For example, February may have 33% capacity allocated for meetings, and the remaining capacity 224 available to be used. As such, resource managers may allocate application developer time based on the amount of time application developers actually have available, taking into account administrative or other time commitments not typically explicitly allocated for.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a non-transitory memory; and
one or more hardware processors configured to execute instructions from the non-transitory memory to perform operations comprising:
identifying a product backlog associated with one or more incomplete software application projects, the product backlog comprising:
a plurality of stories to be completed according to an agile methodology; and
a plurality of tasks to be completed according to a waterfall methodology;
generating a plurality of release backlogs from the product backlog, wherein the plurality of release backlogs comprises a respective combination of a story from the plurality of stories and a task from the plurality of tasks, wherein the respective combination comprises a respective dependency between the story and the task;
generating a hybrid project, an agile project, a waterfall project, or a combination thereof, based on the plurality of release backlogs and the respective dependency; and
applying the hybrid project, the agile project, the waterfall project, or the combination thereof, to a collection of projects associated with completing the one or more incomplete software application projects.

2. The system of claim 1, wherein applying the hybrid project, the agile project, the waterfall project, or the combination thereof, comprises applying an additional dependency between the hybrid project, the agile project, the waterfall project, or the combination thereof, and the respective combination of the story and the task.

3. The system of claim 1, wherein the respective dependency between the story and the task is preserved through applying the hybrid project, the agile project, the waterfall project, or the combination thereof.

4. The system of claim 1, wherein the operations comprise receiving an indication of whether the agile project, the waterfall project, or the combination thereof, is to be applied as an agile phase or a waterfall phase.

5. The system of claim 1, wherein each story, task, or both, associated with each release backlog of the plurality of release backlogs is ordered based on relative priority with respect to one another.

6. The system of claim 1, wherein the operations comprise organizing the collection of projects, and the applied hybrid project, the applied agile project, the applied waterfall project, or the combination thereof, based on an indication of available developer time, developer percent capacity, available work days, or any combination thereof.

7. The system of claim 1, wherein the operations comprise rearranging resources during a sprint of the agile project by tracking progress in each sprint of the agile project.

8. The system of claim 1, wherein the plurality of release backlogs is generated from the product backlog based on feedback indicative of a bug associated with a previous software application, a target functionality for the one or more incomplete software application projects, or both.

9. The system of claim 1, wherein the hybrid project, the agile project, the waterfall project, or the combination thereof, is applied as a phase to be implemented according to the agile methodology or the waterfall methodology.

10. The system of claim 9, wherein the operations comprise:
overlaying a menu on a user interface; and
receiving, via the menu, a selection of whether the phase is to be added to the hybrid project as an agile phase or a waterfall phase.

11. A non-transitory computer-readable medium comprising computer-readable code, that when executed by one or more processors, causes the one or more processors to perform operations comprising:
identifying a product backlog associated with one or more incomplete software application projects, the product backlog comprising:
a plurality of stories to be completed according to an agile methodology; and
a plurality of tasks to be completed according to a waterfall methodology;
generating a plurality of release backlogs from the product backlog, wherein the plurality of release backlogs comprises a respective combination of a story from the plurality of stories and a task from the plurality of tasks, wherein the respective combination comprises a respective dependency between the story and the task;
generating a hybrid project, an agile project, a waterfall project, or a combination thereof, based on the plurality of release backlogs and the respective dependency; and
applying the hybrid project, the agile project, the waterfall project, or the combination thereof, to a collection of projects associated with completing the one or more incomplete software application projects.

12. The non-transitory computer-readable medium of claim 11, wherein applying the hybrid project, the agile project, the waterfall project, or the combination thereof, comprises applying an additional dependency between the hybrid project, the agile project, the waterfall project, or the combination thereof, and the respective combination of the story and the task.

13. The non-transitory computer-readable medium of claim 11, wherein the respective dependency between the story and the task is preserved through applying the hybrid project, the agile project, the waterfall project, or the combination thereof.

14. The non-transitory computer-readable medium of claim 11, wherein the operations comprise receiving an indication of whether the agile project, the waterfall project, or the combination thereof, is to be applied as an agile phase or a waterfall phase.

15. The non-transitory computer-readable medium of claim 11, wherein the operations comprise organizing the collection of projects, and the applied hybrid project, the applied agile project, the applied waterfall project, or the combination thereof, based on an indication of available developer time, developer percent capacity, available work days, or any combination thereof.

16. The non-transitory computer-readable medium of claim 11, wherein the plurality of release backlogs is generated from the product backlog based on feedback indicative of a bug associated with a previous software application, a target functionality for the one or more incomplete software application projects, or both.

17. A method, comprising:

identifying a product backlog associated with one or more incomplete software application projects, the product backlog comprising:

a plurality of stories to be completed according to an agile methodology; and a plurality of tasks to be completed according to a waterfall methodology;

generating a plurality of release backlogs from the product backlog, wherein the plurality of release backlogs comprises a respective combination of a story from the plurality of stories and a task from the plurality of tasks, wherein the respective combination comprises a respective dependency between the story and the task;

generating a hybrid project, an agile project, a waterfall project, or a combination thereof, based on the plurality of release backlogs and the respective dependency; and applying the hybrid project, the agile project, the waterfall project, or the combination thereof, to a collection of projects associated with completing the one or more incomplete software application projects.

18. The method of claim 17, wherein applying the hybrid project, the agile project, the waterfall project, or the combination thereof, comprises applying an additional dependency between the hybrid project, the agile project, the waterfall project, or the combination thereof, and the respective combination of the story and the task.

19. The method of claim 17, wherein the respective dependency between the story and the task is preserved through applying the hybrid project, the agile project, the waterfall project, or the combination thereof.

20. The method of claim 17, comprising receiving an indication of whether the agile project, the waterfall project, or the combination thereof, is to be applied as an agile phase or a waterfall phase.

* * * * *